July 30, 1940.  A. OBERMOSER  2,209,417
STEPLESS GEAR CONTROL
Filed Nov. 30, 1937  4 Sheets-Sheet 1
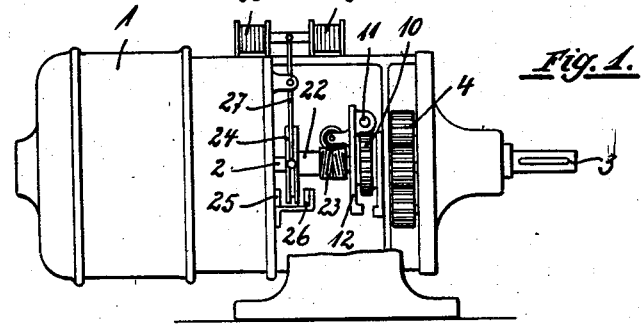
Inventor:
Albert Obermoser July 30, 1940.     A. OBERMOSER     2,209,417
STEPLESS GEAR CONTROL
Filed Nov. 30, 1937     4 Sheets-Sheet 2
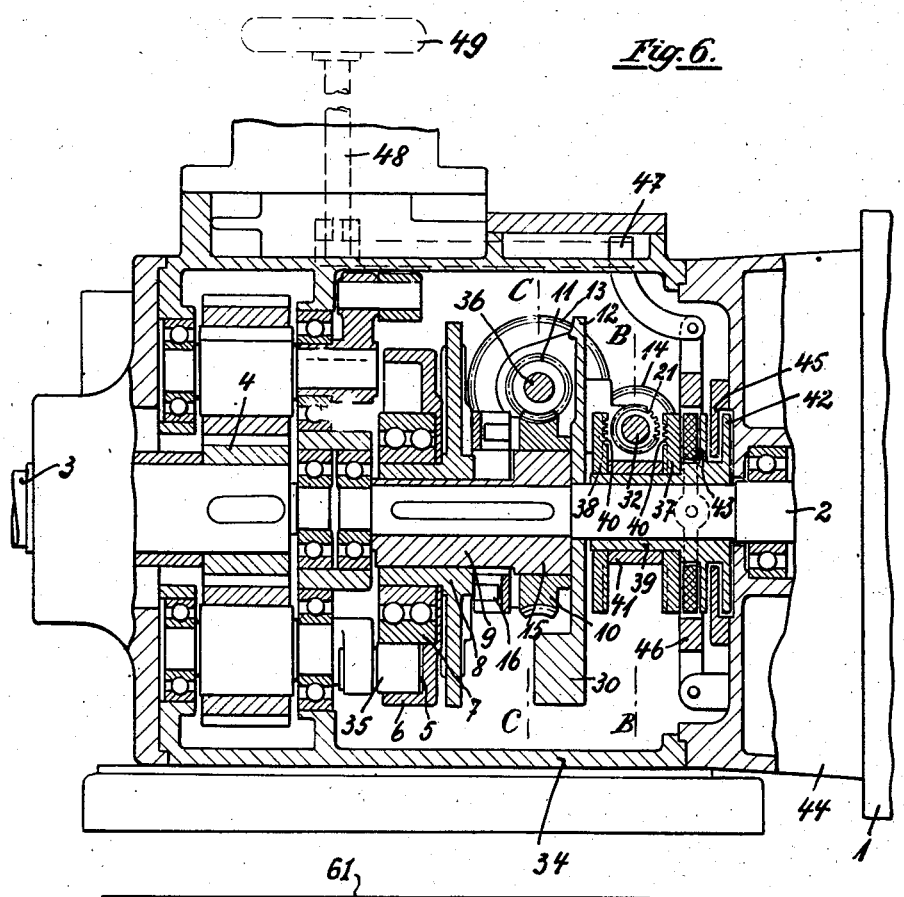
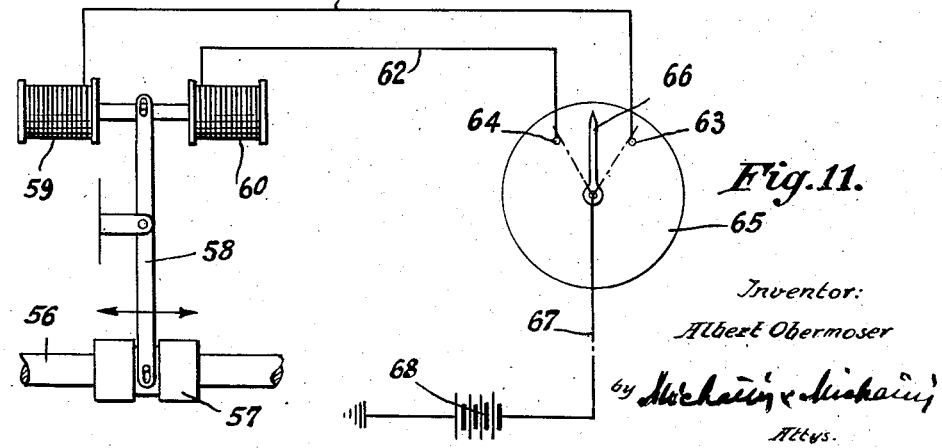
Inventor:
Albert Obermoser Inventor:
Albert Obermoser Patented July 30, 1940

2,209,417

UNITED STATES PATENT OFFICE 2,209,417

STEPLESS GEAR CONTROL

Albert Obermoser, Bruchsal-Baden, Germany

Application November 30, 1937, Serial No. 177,217
In Germany December 4, 1936

10 Claims. (Cl. 74—114)

This invention relates to gears of the stepless control type, and more particularly to gears of such type where the movement of the driving shaft is transmitted to the driven shaft by means of planet wheels actuated by crank gears, the stroke of which is varied in a stepless manner, whereby the transmission ratio for the two shafts is varied correspondingly.

As is well known to those skilled in the art, with gears of the afore-mentioned type hitherto the displacement of the crank gears, which were guided by a ring disk, was effected by means of some sort of gate control, this arrangement being accompanied by the drawbacks that it takes up comparatively large space and is quite complicated not only with respect to its manufacture, but quite especially also in regard to the displacement of the gate control during operation.

It is an object of the present invention to provide a gear of the type aforesaid where the stepless control movement is effected in a much simpler, space-saving and readily from any optional point controllable manner.

Other objects, and the manner in which the same are attained, will appear from the following description.

According to the invention, the ring disk receiving the crank gears is journaled on an eccentric control disk, which control disk in turn is loosely arranged on an eccentric hollow shaft arranged for rotation with the driving shaft. The eccentricity of the control disk may be adjusted with respect to the driving shaft according to requirements, whereby the ratio of the numbers of revolutions of the driving and the driven shaft is positively varied in a corresponding manner. If the eccentricities of the hollow shaft and the control disk are provided of equal size, the total eccentricity which determines the transmission ratio may be varied between the value zero and twice the value of a single eccentricity. Inversely, an optional ratio of the total eccentricity may be obtained by a variation of the eccentricities of the two eccentric members, whereby the lowest value may be so determined that the range of numbers of revolutions is restricted, according to requirements, by upper and lower limits.

For the rotary displacement of the eccentric disk on the hollow shaft preferably a gear comprising spur gears and a worm gear is used, which is rigidly connected with, and thus permanently revolves with, the eccentric hollow shaft, whereby it takes along the control disk which is loosely mounted on the hollow shaft. In order to connect the adjusting gear with the control disk without play, preferably a cross slide is used which admits of a radial displacement of the driver members into directions vertical with respect to each other.

During standstill the adjusting gear may be directly manually operated by any well known means, for example, by a manually actuated crank or adjusting lever. However, in order to be able to effect a displacement also at any time during operation and, if necessary, from a distant point, the following arrangement may be used to advantage. On the driving shaft there is arranged an axially displaceable bushing provided with screw threads, which threads mesh with a pinion or toothed quadrant having the same pitch and being mounted on a shaft which drives, by means of spur gears or the like, the adjusting worm. Since this feed pinion revolves with the adjusting gear and the driving shaft, by maintaining the screw-threaded bushing in a certain position or by axially displacing the same in a measure which is independent of the pitch, a rotary displacement of the feed pinion is effected, which in turn effects, through the adjusting gear, a change in the eccentricity of the control disk. This may be effected, for example, in a manner such that the screw-threaded bushing is rigidly connected with a brake disk, or is adapted to become connected with such brake disk by displacement, the brake disk being caused, for purposes of gear control, to abut against brake planes so as to be fixed in position with respect to the driving shaft. If the screw-threaded bushing is provided with two different screw threads having opposed pitches and meeting in the center of the bushing, the direction of revolution of the control gear may be reversed, by the displacement and subsequent braking of the bushing in one or the other direction, without the direction of revolution of the driving shaft being required to be changed.

The screw-threaded bushing with the brake disk preferably is displaced by means of a fork-shaped lever or a slide rod or the like, which may be controlled either by hand or by remote control, preferably by electromagnetic means. Thus it is possible to control the gear from any desired distant point. For example, if this gear is used in the transmission of power to a machine tool, the workman may control the speed of the working shaft or the tools according to requirements from the working position, without the necessity of bothering with the drive. For this purpose, he needs only to observe the speed on a speed measuring device such as e. g. a tachometer, and to switch in, by means of any well known switching device, for example, an electromagnetic control, until the tachometer shows the new speed desired.

A further improvement, in particular in regard to the adjustment, in optional direction, of the eccentricity of the control disk during operation may be obtained, if the feed pinion does not cooperate with a screw-threaded sleeve, but with plane disks arranged for vertical displacement with respect to the axis of such pinion, the surfaces of such disk facing the feed pinion being provided with spiral-shaped screw threads or grooves. These feed disks are arranged in a manner such that during control of the gear they do not take part in the revolution of the shaft, thus being also fixed with respect to the adjusting gear revolving with the same, whereby a rotary displacement of the feed pinion meshing with the toothed spirals of one or the other feed disk is effected. The arrangement may be either such that the feed disks during normal operation revolve with the driving shaft, but are braked for the purposes of the gear control, or else the feed disks are permanently prevented from any rotary movement and must be displaced axially, for purposes of gear control, only sufficiently far as to cause one of the two disks to mesh with the feed pinion. In both cases the feed disks are arranged preferably on a sleeve which is mounted on the driving shaft for axial and rotary displacement with respect to the same, which sleeve may be displaced from the outside in one or the other direction in a manner such that one of the feed disks is brought into engagement with the feed pinion.

Thus the adjustment of the eccentricity of the control disk in one or the other direction, and an increase or reduction in the number of revolutions of the driven shaft are effected in a particularly simple manner.

The gear according to the invention may be further adapted, in a simple manner, for automatic control effected in dependency upon the working speed, for example, the cutting speed at the point worked upon. For example, as is well known to those skilled in the art, in the working of pieces of work having variable work diameters, the most favorable results are obtained, if the working speed, for example, the cutting speed, is maintained approximately constant even with varying diameters and varying circumferential speeds of the piece of work at the point worked upon. In accordance with the invention these most favorable results are obtained by influencing the electromagnetic control by a speed-measuring device measuring the working, for example, the cutting speed. In this case, when the desired speed is not reached or is exceeded, the gear is automatically adjusted in a manner such that the number of revolutions of the driven shaft is varied correspondingly.

For this purpose, the speedometer, which may be provided as a pointer device of any well known type, is inserted in the electric circuits leading to the control magnets in a manner such that in the two end positions of the pointer limiting the admitted play of the working, in particular, cutting speeds, the electric circuit is closed with respect to one or the other of the two control magnets, whereby the control sleeve is displaced in the sense of an increase or reduction, respectively, of the number of revolutions of the working shaft.

In the drawings affixed to this specification and forming part thereof several embodiments of my invention are illustrated diagrammatically by way of example.

In the drawings:

Fig. 1 is a diagrammatic side elevation showing the general arrangement of the gear in connection with an electromotor;

Fig. 2 is an axial cross section taken through a control gear as generally indicated in Fig. 1;

Fig. 3 is a front elevation showing the control gear illustrated in Fig. 2 as seen from the right hand side;

Fig. 4 is a cross section taken along the line A—A in Fig. 2;

Fig. 5 is a perspective view of a detail of Fig. 2;

Fig. 6 illustrates an axial cross section through a modification of the gear and the planet gear connected therewith;

Fig. 10 shows a cross section along the line D—D of Fig. 9; while

Fig. 11 illustrates a wiring diagram for an arrangement where the gear is controlled in dependency upon the working speed at the point worked upon.

Figure 7:
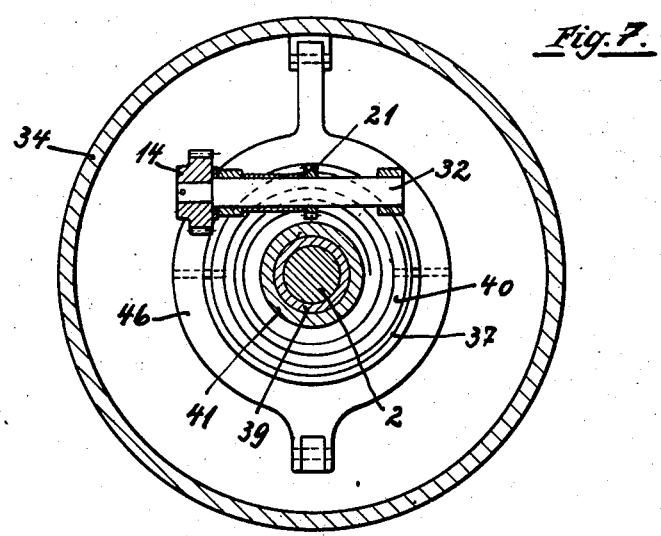
Fig. 7 shows a cross section taken along the line B—B of Fig. 6.

Referring now to the drawings and first to Figs. 1–5, an electromotor or other source of power 1 is provided with a shaft 2 from which the energy is to be transmitted to the driven shaft 3. In order to effect a stepless variation of the ratio of the numbers of revolutions of the two shafts 2 and 3, there is inserted, intermediate the two shafts, a planetary gear 4, which is driven, in a manner which in itself is known, by means of crank gears (such as shown in Fig. 6) provided for an adjustment of the crank stroke, which are guided in the groove 5 of a ring disk 6.

In order to vary the stroke of the crank gears and thus the ratio of the numbers of revolutions, the following arrangement is employed:

The ring disk 6 is journaled for rotation, preferably by means of a ball or needle bearing 7, on an eccentric disk 8, which in turn is mounted for rotation on an eccentric hollow shaft 9 which is rigidly connected with the driving shaft 2. The eccentricities of the hollow shaft and the eccentric disk may be chosen so as to be of equal size, whereby the total eccentricity determining the ratio of the numbers of revolutions may vary between the value zero and twice the value of each eccentricity. However, it is also possible to provide the eccentricities different in a predetermined proportion, in which case a predetermined limitation of the maximum and minimum numbers of revolutions is obtained.

The rotary displacement of the control disk 8 on the hollow shaft 9 is effected by means of an adjusting gear, which essentially comprises a worm wheel 10, which is arranged for rotary displacement on a centric collar 15 provided on the hollow shaft, and a worm 11, which is journaled in a disk 12 which is rigidly connected with the hollow shaft or even is integral therewith, and which may be driven through spur gear wheels 13, 14. When the worm wheel 10 is rotarily displaced with respect to the hollow shaft 9, the control disk 8 is taken along by a cross ring 16, which is provided with two pairs of slots or grooves 17 and 18 arranged vertically to each other and extending in radial direction, either of which engages bolts or journals 19 or 20 which are rigidly connected with the worm wheel or the control disk, respectively. On the shaft 22 of the spur gear wheel 14 there is keyed a further toothed wheel or toothed segment 21, the teeth of which engage the screw threads of a screw-threaded sleeve 22 which is loosely mounted for axial displacement on the driving shaft 2. This screw-threaded sleeve is provided with a left-handed thread 23 and a right-handed thread 23a and, at its one end, is rigidly connected with a brake disk 24, which may be axially displaced so as to abut against either one of the brake abutments 25, 26, which are rigidly connected with the standard of the unit. For the purpose of displacing the screw-threaded sleeve with the brake disk, for example, a fork-shaped lever 27 may be used, which may be displaced, either manually or, in accordance with Fig. 1, by remote control through two electromagnets 28, 29 in one or the other direction, whereby one or the other screw thread is brought into engagement, the displacement towards the right or left before braking determining which of the screw threads is brought into engagement.

The masses of the gear disk 12 and the control disk 8 each are compensated by means of counterweights 30 and 31 in a manner such that the centrifugal forces are completely balanced.

The operation of the embodiment of the invention according to Figs. 1-5 is as follows: During normal operation all parts of the gear uniformly revolve, owing to their arrest with respect to each other, with the driving shaft. However, if the ratio of the numbers of revolutions is to be varied, the screw-threaded sleeve is displaced in one or the other direction, whereupon it is braked. Hereby the toothed segment 21 engaging the screw threads of the sleeve is rotarily displaced, whereby also the worm 10 and the control disk 8 are displaced. This control procedure continues as long as the screw-threaded sleeve is prevented from revolving with the other parts of the gear. As soon as the screw-threaded sleeve is set free, the entire gear, as a rigid unit, again revolves at the new transmission ratio.

Figure 8:
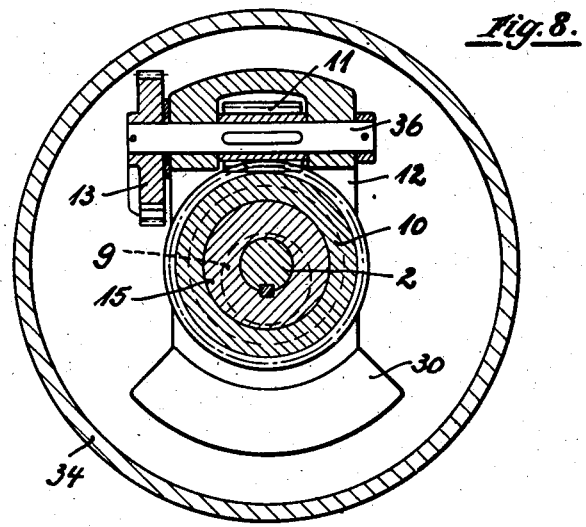
Fig. 8 is a cross section taken along the line C—C of Fig. 6.

Referring now to Figs. 6-8, these figures illustrate a gear including feed disks which are displaceable vertically with respect to the feed pinion, those parts which essentially correspond to those shown in Figs. 1-5 being indicated by like reference numerals.

The driving engine is shown at 1 and includes the driving shaft 2 from which power is to be transmitted to the driven shaft 3, a planetary gear 4 being interposed between the two shafts and being driven by crank gears 35, which are guided in the groove 5 of the ring disk 6. This ring disk is journaled, by means of a ball bearing 7, on the control disk 8, which is mounted for rotary displacement on the eccentric hollow shaft 9, which is rigidly connected with the shaft 2. The entire gear unit is enclosed in a casing 34.

For the rotary displacement of the control disk 8 on the hollow shaft 9 an adjusting gear is used, which essentially comprises a worm wheel 10 mounted on the centric collar 15 of the hollow shaft, a worm 11 and a catch ring 16, which latter is connected, in the manner described with respect to Figs. 1-5, by means of slots and bolts, with the worm wheel 10 on the one hand, and with the control disk 8 on the other hand. The shaft 36 of the worm 11 is journaled on the disk 12 and carries the pinion 13 cooperating with the pinion 14, said latter pinion on its shaft 32 carrying the feed pinion 21.

On both sides of the feed pinion 21 there are arranged plane disks 37 and 38 which are provided with spiral-shaped toothed grooves 40 and which are mounted on a control sleeve 39, which in turn is loosely arranged for axial displacement on the shaft 2. The groove disks 37 and 38 are spaced from each other by means of a sleeve 41 at a distance such that only one of the two disks at a time may engage the feed pinion 21.

With the modification of the invention according to Figs. 6-8 the sleeve 39, at one end, carries brake disks 42 and 43, one or the other of which, dependent upon the position of the sleeve, may engage a two-sided brake ring 45 arranged on the motor casing 44.

The operation of the device according to Figs. 6-8 is as follows: When the control sleeve and the grooved disks connected therewith are braked, the feed pinion revolving with the gear about the axis of the driving shaft is rotarily displaced and effects in turn, by means of the adjusting gear, a variation of the eccentricity and thus of the transmission ratio.

The control sleeve 39 is displaced by means of the guard-like lever 46, which in the axial center plane is linked to the sleeve from both sides and may be operated from the outside in both directions, for example, through a rod 47, a spindle 48 and a hand wheel 49, or by any optional mechanical or electric drive.

Figure 9:
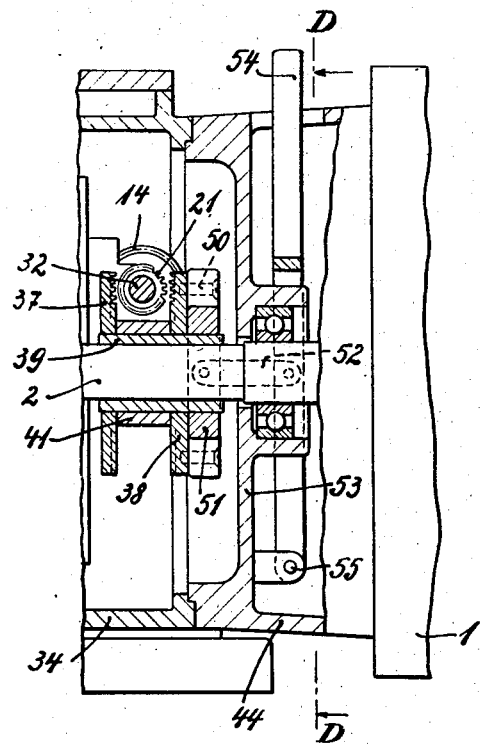
Fig. 9 is a partial cross section through a further modification of the gear.
Figure 10:
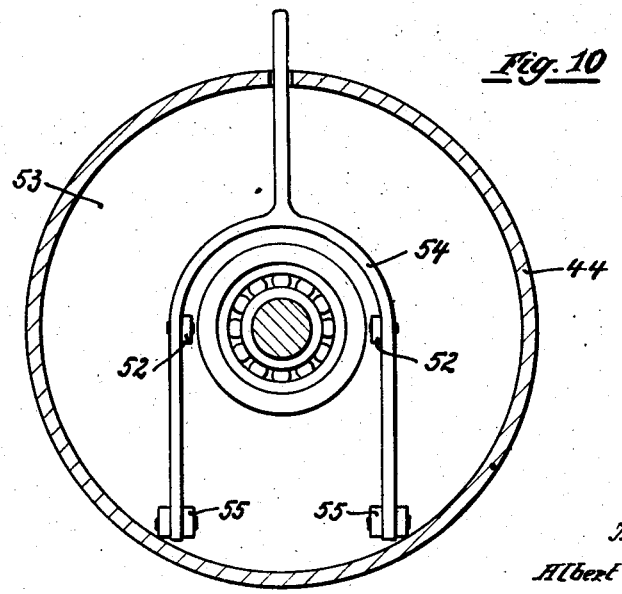

A similar arrangement is shown in Figs. 9-10. In this case the feed disks 37 and 38 and the control sleeve 39 are connected, by means of bolts 50, with a disk 51, which in turn is linked to two lateral link members 52. These link members extend outwardly through the bearing bracket 53 of the motor casing and are connected to a fork-shaped lever 54, which may be moved about the links 55 in a manner such that the control sleeve 39 is axially displaced in one or the other direction, until one of the two feed disks engages the feed pinion 21. Since in this case the sleeve and the feed disks cannot revolve with the shaft, the feed pinion, upon engagement with one of the feed disks, is rotarily displaced by its guidance along the spiral-shaped toothed grooves of the feed disk, whereby in turn the adjusting gear is actuated.

Fig. 11 shows an example for an arrangement where the control of the gear is effected automatically in dependency upon e. g. the cutting speed of the driven machine tool.

The driving shaft such as the engine shaft of the gear is indicated at 56. On this shaft there is mounted for axial displacement the control sleeve 57, by the displacement of which the number of revolutions of the driven shaft is varied in the manner described above. The displacement of the control sleeve is effected by means of the lever 58, which is moved in one or the other direction by the electromagnets 59 or 60 in dependency upon which of the magnets receives current. The supply of current to the magnets takes place through the wires 61 or 62, which are connected with contacts 63 or 64, respectively, which are built in, in an insulated manner, in the casing of the speedometer 65. The contacts are so provided that pointer 66 in its end positions closes one or the other contact, whereby the same is connected, through a wire 67 leading to the axle of the pointer, to the positive pole of a source of current 68. The negative pole of the source of current as well as each one pole of each of the two electromagnets is connected with mass in a well known manner.

The center position of the pointer 66 corresponds to the desired cutting speed. If this speed is altered, the pointer is thrown toward one or the other side and thus closes the electric circuit for that magnet, which causes the control sleeve to be displaced in a sense such that by corresponding variation of the number of revolutions of the driven shaft of the gear at the point worked upon the original cutting speed is restored. As soon as a recurrent variation of the cutting speed takes place in this sense, the pointer 11 also returns from its end position in a manner such that the gear continues to operate at the ratio of numbers of revolutions to which it is now adjusted. Thus, whenever the piece of work displays a great variation in the diameters to be worked upon, the pointer oscillates to and fro between the center position and the end positions, whereby the cutting speed is maintained constant within the predetermined limits.

The contacts 63 and 64 may be provided in any optional manner. More particularly, they may be provided as spring contacts or as double contacts. It has been found to be particularly favorable to arrange a mercury tilting switch on the pointer itself, the oscillation of the pointer itself tilting such switch so as to close one or the other circuit for one of the electromagnets.

I wish it to be understood that I do not desire to be limited to the exact details of construction shown and described for obvious modifications will occur to a person skilled in the art.

I claim:

1. In a variable speed transmission mechanism comprising a driving shaft and a driven shaft, in combination, an eccentric hollow shaft arranged for revolution with said driving shaft, an eccentric control disc loosely mounted on said hollow shaft and adapted to control said driven shaft, and means for rotarily displacing said control disc relative to said hollow shaft so as to vary the total eccentricity of said disc and said hollow shaft, said means comprising a worm wheel mounted for rotary displacement on said hollow shaft and adapted to take along, on being rotated, said control disc, a worm meshing with said worm wheel and having a worm shaft mounted on said hollow shaft, a feed pinion arranged for driving said worm shaft, a sleeve displaceably mounted on said driving shaft and comprising screw-threaded portions adapted to mesh with said feed pinion, and means for axially displacing said sleeve.

2. In a variable speed transmission mechanism comprising a driving shaft and a driven shaft, in combination, an eccentric hollow shaft arranged for revolution with said driving shaft, an eccentric control disc loosely mounted on said hollow shaft and adapted to control said driven shaft, and means for rotarily displacing said control disc relative to said hollow shaft so as to vary the total eccentricity of said disc and said hollow shaft, said means comprising a worm wheel mounted for rotary displacement on said hollow shaft and adapted to take along, on being rotated, said control disc, a worm meshing with said worm wheel and having a worm shaft mounted on said hollow shaft, a feed pinion arranged for driving said worm shaft, a screw-threaded sleeve mounted for rotary displacement on said driving shaft, said screw-thread meshing with said feed pinion, means for axially displacing said sleeve, a brake disc mounted on said sleeve and fixed braking means arranged for cooperation with said brake disc upon displacement of said sleeve.

3. The mechanism according to claim 2, wherein the screw-threaded sleeve includes a left-handed and a right-handed thread, whereby the adjusting movement may be reversed, while the direction of revolution of the driving shaft is maintained.

4. In a variable speed transmission mechanism comprising a driving shaft and a driven shaft, in combination, an eccentric hollow shaft arranged for revolution with said driving shaft, an eccentric control disc loosely mounted on said hollow shaft and adapted to control said driven shaft, and means for rotarily displacing said control disc relative to said hollow shaft so as to vary the total eccentricity of said disc and said hollow shaft, said means comprising a worm wheel mounted for rotary displacement on said hollow shaft and adapted to take along, on being rotated, said control disc, a worm meshing with said worm wheel and having a worm shaft mounted on said hollow shaft, a feed pinion arranged for driving said worm shaft, a sleeve displaceably mounted on said driving shaft, feed discs provided with spiral-shaped toothed grooves mounted on said sleeve and arranged for vertical displacement relative to the axis of said feed pinion and adapted to mesh therewith, said feed discs being arranged so as to be fixed relative to said feed pinion during the gear control operation, and means for axially displacing said sleeve.

5. The mechanism according to claim 4, wherein one feed disc is arranged on each of two diametrically opposed sides of the feed pinion, said displacing means being adapted to cause either feed disc to mesh with said feed pinion, whereby the adjustment of the total eccentricity of the control disc and the hollow shaft is effected in one or the other direction, in dependency upon which one of the feed discs engages said feed pinion.

6. The mechanism according to claim 4, wherein the feed discs are arranged for revolution with the driving shaft during normal operation, and are adapted to be braked during the control operation.

7. The mechanism according to claim 4, wherein the two feed discs are connected with the axially displaceable sleeve, said sleeve being provided with brake discs, and stationary abutments adapted to coact with said brake discs so as to brake said sleeve upon the axial displacement thereof.

8. The mechanism according to claim 4, including brake discs mounted on, and a lever linked to, the displaceable sleeve, and means for actuating said sleeve from the outside so as to axially displace said sleeve, whereby either one of the feed discs is brought into engagement with the feed pinion and simultaneously the corresponding brake disc is rendered operative.

9. The mechanism according to claim 4, including a transmission casing and a bearing bracket thereof, a forked lever, and link members penetrating said bearing bracket and connecting said lever with the displaceable sleeve, said lever being adapted to axially displace said sleeve so as to bring either brake disc in engagement with the feed pinion.

10. The mechanism according to claim 1, wherein the means for axially displacing the sleeve comprise a remote control device including two electromagnets.

ALBERT OBERMOSER.